United States Patent [19]

Brenner

[11] Patent Number: 4,709,855

[45] Date of Patent: Dec. 1, 1987

[54] RECIRCULATING HEATING SYSTEM

[76] Inventor: Barnett S. Brenner, 343 E. Prince Rd., Tucson, Ariz. 85705

[21] Appl. No.: 880,291

[22] Filed: Jun. 30, 1986

[51] Int. Cl.⁴ .............................................. B60H 1/02
[52] U.S. Cl. .................................. 237/12.3 A; 98/2.05
[58] Field of Search ...................... 237/12.3 A, 12.3 C, 237/12.3 R; 123/142.2 R; 98/2.05; 98/2.06, 2.07, 2.08

[56] References Cited

U.S. PATENT DOCUMENTS 3,278,121 10/1966 Komenda ...................... 237/12.3 A
4,537,349 8/1985 Stolz .............................. 237/12.3 C Primary Examiner—Henry A. Bennet
Attorney, Agent, or Firm—Richard C. Litman

[57] ABSTRACT

An improved system and method of heating the passenger compartment of a motor vehicle preferably with a rear or mid-mounted engine comprises an air blower delivering clean air from the passenger compartment directly to the heat exchangers extracting heat from hot engine exhaust gas, and recirculating heated clean air back to the passenger compartment.

4 Claims, 2 Drawing Figures

RECIRCULATING HEATING SYSTEM

This invention relates to an improved system of heating the passenger compartment of a motor vehicle, preferably one having a rear or mid-mounted engine. More specifically, it relates to a system for recirculating heated air from the passenger compartment of a motor vehicle through a heat exchanger extracting heat by indirect heat exchange from the hot engine exhaust gas, while not allowing the infiltration of dust from outside air.

Motor vehicles made for many years by the Volkswagen Company of Wolfsburg, Federal Republic of Germany, have employed rear mounted engines. Examples of such vehicles are the VW "Beetle," the Karmann-Ghia, the VW bus or van, and several models of the Porsche.

On these models, air is drawn from outside the vehicle into the engine space by an engine cooling blower, a high-speed centrifugal blower (800–8000 rpm), (the blower operating at 800 rpm at idle on the "Type III" VW and at 8000 rpm at 5000 engine rpm on the Beetle and like models) rotating inside a blower casing, driven by the engine via a belt-and-pulley drive, a portion of said air then passing through cooling passages in the engine block and, a portion of said air going via air ducts, to two heat exchangers. Here, the air is heated by indirect heat exchange with hot engine exhaust gas. The heated air is then either vented to the outside, or led into the passenger compartment for heating, or split between the outside vent and the passenger compartment depending on the adjustment of vent dampers in the ductwork. Hot engine exhaust gas flows from the engine via the exhaust manifold to a central tube in each heat exchanger and from here to the muffler and tailpipes to the outside.

A particular problem with rear and mid-engine vehicles where the air intake supply vents are located toward the rear of the vehicle is that they draw in dust and pollens kicked up by the front wheels of the vehicle. This is a particular problem when the vehicle is driven on dirt roads or over open terrain. While a front engine car, with the air intake located ahead of the front wheels, need only be concerned with the small amount of dust that may already be airborne or be generated by cars driving ahead or passing, the rear engine vehicle creates its own source of dust contamination as it drives along. Present heater configurations are particularly susceptible to this dust contamination of the vehicle interior by continuously introducing air drawn from the outside of the vehicle into the driver's compartment. The present invention, by recycling the air within the driver's compartment, completely eliminates this problem. Fresh air, when desired, may be introduced into the driver's compartment by cracking or opening a forward window or vent, which does not introduce dust produced by the front wheels of the vehicle.

U.S. Pat. No. 2,302,416 relates to a heating system intended for mixing air between compartments of a motor vehicle divided by seats in order to produce an even temperature throughout the vehicle. It does not address the specific probelms of a heating system in a vehicle which uses the exterior ambient air as the source of air for the heater.

Another drawback in this type of vehicle is that, in cold weather, when the engine is idling and the engine cooling blower rotates at relatively low speed, the flow of heated air can be insufficient to maintain a comfortable temperature in the passenger compartment, especially since the air being drawn from the outside is cold.

Several methods for overcoming these drawbacks have been proposed. U.S. Pat. No. 3,202,075 draws air from the passenger compartment into the engine cooling blower, mixing it with air drawn in from the outside. Because the recirculated air is heated, temperature control is improved. However, this method still suffers from the fact that dirt and dust from the outside and engine odors are drawn into the air circulation stream entering the passenger compartment. Furthermore, when the engine is idling and the engine cooling blower revolves at a low speed, the air flow into the passenger coMpartment still can be insufficient to maintain a comfortable temperature in the passenger compartment. U.S. Pat. No. 3,908,900 seeks to overcome this last drawback by providing a separate, additional blower which pulls air from the passenger compartment while the engine is idling is adequate with the improvement provided by U.S. Pat. No. 3,908,900. However, pollen and dust from the road and odors from the engine still enter the air circulation stream entering the passenger compartment. Furthermore, since the engine cooling blower is more powerful than the additional blower provided by U.S. Pat. No. 3,908,900, the latter has to be protected against being spun backward by a check valve, when the engine is running at high speed and the engine cooling blower delivers a relatively high air flow and air pressure on its discharge side.

It is the object of this invention to provide a system of maintaining a comfortable temperature in the passenger compartment of a motor vehicle with a rear mounted engine when the weather is cold. It is a further object of this invention to avoid the injection of pollen and dust from the road and odors from the engine into the passenger compartment. An additional object of this invention is the avoidance of the need for a check valve as required by U.S. Pat. No. 3,908,900, check valves having an ability to get stuck open, upsetting the proper operation of the air circulation system.

DETAILED DESCRIPTION OF THE PREFERRED EMBODIMENT OF THIS INVENTION

Figure 1:
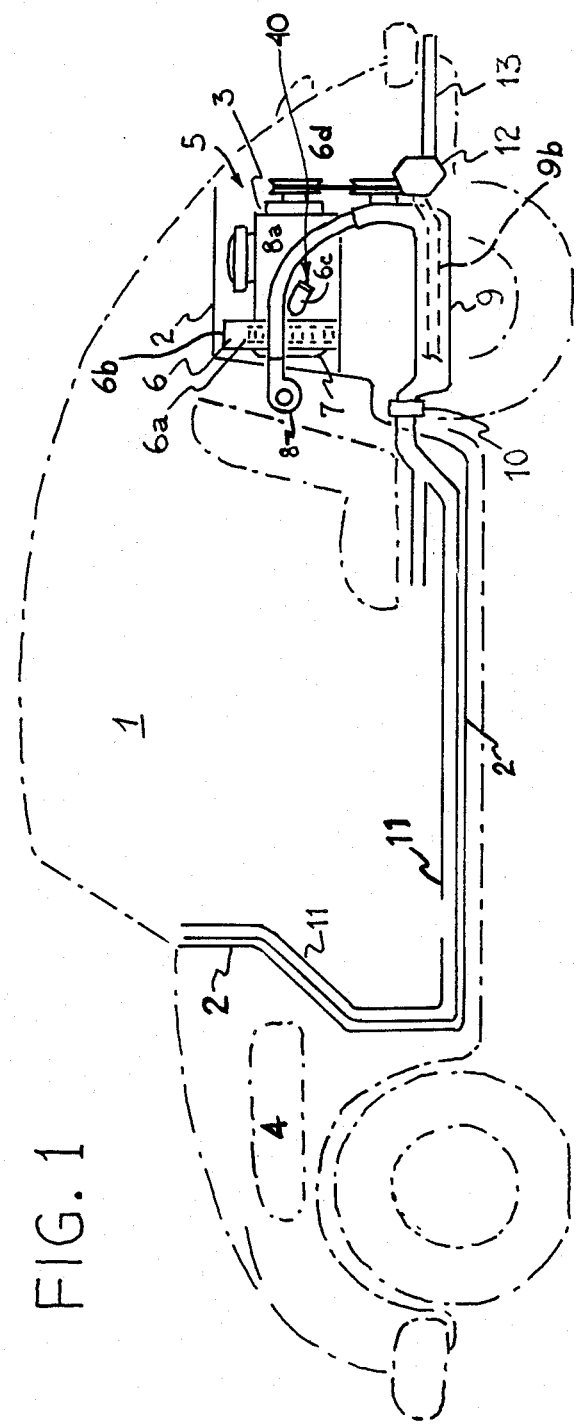
FIG. 1 shows in cross section a partial view of a Volkswagen "Beetle" with a preferred embodiment of this invention.

Referring to FIG. 1, there is shown a partial cross section of a Volkswagen "Beetle" having a passenger compartment 1, a firewall 2 separating the passenger compartment from the engine 3 in the rear and the fuel tank 4 in the front. Engine cooling air is drawn in at 5, entering the engine cooling blower 6 at 7. The high-speed impeller 6a rotating inside the blower casing 6b driven by the engine 3 by a velt-and-pulley drive 6d, causes a portion of air to flow through cooling passages in the engine block (not shown). Another portion of air is conventionally led via two air hoses from hose connections 6c to two heat exchangers 9. In accordance with this invention, the hose connections 6c are blocked by the plug 40 provided at the hose connections at the exits of the passages.

Air is drawn from the passenger compartment 1 by a blower 8, mounted on the firewall 2 in the passenger compartment 1 behind the back seat, with the air discharged by the blower passing through an opening in the firewall 2. The air is led via two air hoses 8a connected in parallel via a T-connection (not shown) to two heat exchangers 9 (only one heat exchanger shown in FIG. 1). The invention may also use two blowers mounted in similar fashion with each supplying air to one heater box thus eliminating the use of a T-connection. A dual outlet blower is also possible. The heated air leaving the heat exchangers 9 flows through an adjustable damper valve 10 which allows the heated air either to be vented to the outside, or to be led via ducts 11 into the passenger compartment 1 for heating, or to be split in any proportion between the outside vent and the ducts 11. The hot engine exhaust gas flows from the engine exhaust manifold (9B) via the heat exchangers 9 to the muffler 12 and via two tailpipes 13 to the atmosphere.

Figure 2:
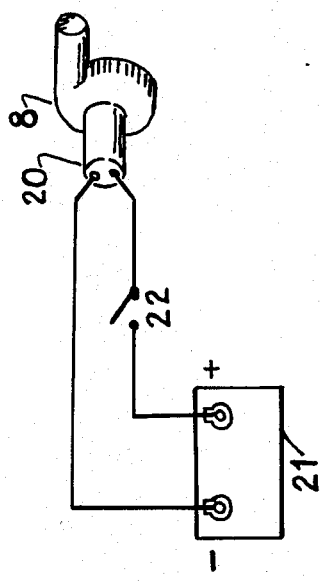
FIG. 2 shows the electric wiring of one of the components of the preferred embodiment of this invention.

Referring to FIG. 2, the blower 8 is driven by an electric motor 20 which is wired in series with the vehicle's battery 21 and a switch 22, which can be closed either when the vehicle's ignition key (not shown) is turned on, or when manually operated.

Since only clear air from the inside of the passenger compartment is recirculated, no pollen and dust from the road and no odors from the engine compartment are picked up and blown into the passenger compartment. Since heated air is recirculated, rather than cold outside air, it is possible to maintain a comfortable temperature in the passenger compartment even in cold weather. When a portion of, or all of the heated air leaving the heat exchangers 9 is vented, the vehicle's windows can be opened slightly to allow fresh air to enter the passenger compartment 1.

Since the blower 8 always operates independently of the engine speed, there is an adequate air circulation flow to the passenger compartment even when the engine is idling and the engine cooling blower is rotating at relatively low speed.

While my invention has been illustrated and explained specifically with respect to the Volkswagen "Beetle," it is to be understood that my invention is applicable to all other types of vehicles with rear or mid-mounted engines, whether made by Volkswagen or by other manufacturers.

I claim:

1. A motor vehicle having a rear or mid-mounted engine and a heating system comprising
   an engine cooling air blower for directing cool air drawn from outside the vehicle through passages in the engine,
   duct or conduit means for directing said cooling air to heat exchanger means to be warmed by indirect heat exchange with hot engine exhaust gas,
   means for conducting said warmed air from said exchanger means to the passenger compartment,
   an air blower driven by an electric motor, preferably mounted on the vehicle's firewall, for drawing air through passageways from the passenger compartment and discharging it into channel means connected at one end to said driven air blower and at the other end to inlets of said heat exchanger means, whereby air drawn from the passenger compartment is circulated through the heat exchanger means and back to the passenger compartment as needed for providing a recirculating heated air system while not allowing infiltration of dust or pollen from outside air usually stirred up by rotating front wheels of the motor vehicle and
   plug means provded at the hose connections at the exits of said channel means.

2. The improvement to a vehicle heating system in accordance with claim 1 further comprising
   air manifold means on a discharge connection of said air blower, and
   said conduit means connected at one end to an outlet or outlets of said air manifold means and at the other end to the inlets of said heat exchanger means.

3. The improvement to a vehicle heating system in accordance with claim 1 in which the electric motor driving the air blower is connected by wiring in series to a battery of the vehicle and to a switch,
   said switch being closed either when an ignition key is turned on, or when manually operated.

4. A motor vehicle heating system according to claim 1, including,
   a plurality of said electric motor driven air blowers.

* * * * *